United States Patent [19]
Yu et al.

[11] Patent Number: 6,074,504
[45] Date of Patent: *Jun. 13, 2000

[54] DEFOCUSED LASER SEAM STRESS RELEASE IN FLEXIBLE ELECTROSTATOGRAPHIC IMAGING MEMBER BELTS

[75] Inventors: Robert C. U. Yu, Webster; Richard L. Post, Penfield; Anthony M. Horgan, Pittsford; Satchidanand Mishra, Webster; Donald C. VonHoene, Fairport; Edward F. Grabowski; Bing R. Hsieh, both of Webster, all of N.Y.

[73] Assignee: Xerox Corporation, Stamford, Conn.

[*] Notice: This patent is subject to a terminal disclaimer.

[21] Appl. No.: 09/004,651

[22] Filed: Jan. 8, 1998

[51] Int. Cl.$^7$ .............................. B32B 1/04; B32B 31/28
[52] U.S. Cl. .................. 156/137; 156/272.8; 156/275.1; 156/285; 156/304.6
[58] Field of Search ..................................... 156/137, 229, 156/272.2, 275.1, 311, 304.1, 304.6, 163, 285, 272.8

[56] References Cited

U.S. PATENT DOCUMENTS

| | | | |
|---|---|---|---|
| 3,988,399 | 10/1976 | Evans | 264/22 |
| 3,989,778 | 11/1976 | Osborne . | |
| 4,532,166 | 7/1985 | Thomsen et al. | 428/57 |
| 4,840,873 | 6/1989 | Kobayashi et al. | 430/273 |
| 4,957,684 | 9/1990 | Knudsen et al. . | |
| 5,021,109 | 6/1991 | Petropoulos et al. | 156/137 |
| 5,085,719 | 2/1992 | Eck . | |
| 5,113,479 | 5/1992 | Anderson et al. | 392/417 |
| 5,240,532 | 8/1993 | Yu . | |
| 5,273,799 | 12/1993 | Yu et al. . | |
| 5,278,938 | 1/1994 | Spigarelli et al. | 392/420 |
| 5,376,491 | 12/1994 | Krumberg et al. | 430/136 |
| 5,552,005 | 9/1996 | Mammino et al. . | |
| 5,578,227 | 11/1996 | Rabinovich | 219/121.63 |
| 5,603,790 | 2/1997 | Rhodes | 156/137 |

FOREIGN PATENT DOCUMENTS

| | | |
|---|---|---|
| 0 627 277 | 12/1994 | European Pat. Off. . |
| 08 292581 | 5/1996 | Japan . |

*Primary Examiner*—Sam Chuan Yao

[57] ABSTRACT

A process for treating a seamed flexible electrostatographic imaging belt including providing an imaging belt having two parallel edges, the belt comprising at least one layer comprising a thermoplastic polymer matrix and a seam extending from one edge of the belt to the other, the seam having an imaginary centerline, providing an elongated support member having at arcuate supporting surface and mass, the arcuate surface having at least a substantially semicircular cross section having a radius of curvature of between about 9.5 millimeters and about 50 millimeters, supporting the seam on the arcuate surface with the region of the belt adjacent each side of the seam conforming to the arcuate supporting surface of the support member, precisely traversing the length of the seam from one edge of the belt to the other with thermal energy radiation having a narrow Gaussian wavelength distribution of between about 10.4 micrometers and about 11.2 micrometers emitted from a carbon dioxide laser, the thermal energy radiation forming a spot straddling the seam during traverse, the spot having a width of between about 3 millimeters and about 25 millimeters measured in a direction perpendicular to the imaginary centerline of the seam, and rapidly quenching the seam by thermal conduction of heat from the seam to the mass of the support member to a temperature below the glass transition temperature of the polymer matrix while the region of the belt adjacent each side of the seam conforms to the arcuate supporting surface of the support member.

15 Claims, 8 Drawing Sheets

DEFOCUSED LASER SEAM STRESS RELEASE IN FLEXIBLE ELECTROSTATOGRAPHIC IMAGING MEMBER BELTS

BACKGROUND OF THE INVENTION

This invention relates in general to a heat treatment process and more specifically, to a process for effective seam stress release in a flexible electrostatographic imaging member belt for improved mechanical service life.

Flexible electrostatographic belt imaging members are well known in the art. Typical electrostatographic flexible belt imaging members include, for example, photoreceptors for electrophotographic imaging systems, electroreceptors such as ionographic imaging members for electrographic imaging systems, and intermediate transfer belts for transferring toner images in electrophotographic and electrographic imaging systems. These belts are usually formed by cutting a rectangular sheet from a web containing at least one layer of thermoplastic polymeric material, overlapping opposite ends of the sheet, and welding the overlapped ends together to form a welded seam. The seam extends from one edge of the belt to the opposite edge.

Flexible electrophotographic imaging member belts are usually multilayered photoreceptors that comprise a substrate, an electrically conductive layer, an optional hole blocking layer, an adhesive layer, a charge generating layer, and a charge transport layer and, in some embodiments, an anti-curl backing layer. One type of multilayered photoreceptor comprises a layer of finely divided particles of a photoconductive inorganic compound dispersed in an electrically insulating organic resin binder. A typical layered photoreceptor having separate charge generating (photogenerating) and charge transport layers is described in U.S. Pat. No. 4,265,990, the entire disclosure thereof being incorporated herein by reference. The charge generating layer is capable of photogenerating holes and injecting the photogenerated holes into the charge transport layer. Generally, these belts comprise at least a supporting substrate layer and at least one imaging layer comprising thermoplastic polymeric matrix material. The "imaging layer" as employed herein is defined as the dielectric imaging layer of an electroreceptor belt, the transfer layer of an intimidate transfer belt and the charge transport layer of an electrophotographic belt. Thus, the thermoplastic polymeric matrix material in the imaging layer is located in the upper portion of a cross section of an electrostatographic imaging member belt, the substrate layer being in the lower portion of the cross section of the electrostatographic imaging member belt.

Although excellent toner images may be obtained with multilayered belt photoreceptors, it has been found that as more advanced, higher speed electrophotographic copiers, duplicators and printers were developed, cracking of the charge transport layer at the welded seam area was frequently encountered during photoreceptor belt cycling. Seam cracking has also been found to rapidly lead to seam delamination due to fatigue thereby shortening belt service life. Dynamic fatigue seam cracking and delamination also occurs in ionographic imaging member belts as well.

The flexible electrostatographic imaging member belt is fabricated from a sheet cut from a web. The sheets are generally rectangular in shape. All edges may be of the same length or one pair of parallel edges may be longer than the other pair of parallel edges. The sheets are formed into a belt by joining overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing, and the like. Ultrasonic welding is generally the preferred method of joining because is rapid, clean (no solvents) and produces a thin and narrow seam. In addition, ultrasonic welding is preferred because it causes generation of heat at the contiguous overlapping end marginal regions of the sheet to maximize melting of one or more layers therein.

When ultrasonically welded into a belt, the seam of multilayered imaging flexible members can crack and delaminate during extended bending and flexing over small diameter belt support rollers of an imaging machine or when subjected to lateral forces caused by rubbing contact with stationary web edge guides of a belt support module during cycling. Seam cracking and delamination is further aggravated when the belt is employed in electrostatographic imaging systems utilizing blade cleaning devices. Alteration of materials in the various photoreceptor belt layers such as the conductive layer, hole blocking layer, adhesive layer, charge generating layer, and/or charge transport layer to suppress cracking and delamination problems is not easily accomplished. The alteration of the materials may adversely affect the overall electrical, mechanical and other properties of the belt such as well as residual voltage, background, dark decay, flexibility, and the like.

For example, when a flexible imaging member in an electrophotographic machine is a photoreceptor belt fabricated by ultrasonic welding of overlapped opposite ends of a sheet, the ultrasonic energy transmitted to the overlapped ends melts the thermoplastic sheet components in the overlap region to form a seam. The ultrasonic welded seam of a multilayered photoreceptor belt is relatively brittle and low in strength and toughness. The joining techniques, particularly the welding process, can result in the formation of a splashing that projects out from either side of the seam in the overlap region of the belt. Because of the splashing, a typical flexible imaging member belt is about 1.6 times thicker in the seam region than that of the remainder of the belt (e.g., in a typical example, 188 micrometers versus 1.6 micrometers).

The photoreceptor belt in an electrophotographic imaging apparatus undergoes bending strain as the belt is cycled over a plurality of support and drive rollers. The excessive thickness of the photoreceptor belt in the seam region due to the presence of the splashing results in a large induced bending strain as the seam travels over each roller. Generally, small diameter support rollers are highly desirable for simple, reliable copy paper stripping systems in electrophotographic imaging apparatus utilizing a photoreceptor belt system operating in a very confined space. Unfortunately, small diameter rollers, e.g., less than about 0.75 inch (19 millimeters) in diameter, raise the threshold of mechanical performance criteria to such a high level that photoreceptor belt seam failure can become unacceptable for multilayered belt photoreceptors. For example, when bending over a 19 millimeter diameter roller, a typical photoreceptor belt seam splashing may develop a 0.96 percent tensile strain due to bending. This is 1.63 times greater than a 0.59 percent induced bending strain that develops within the rest of the photoreceptor belt. Therefore, the 0.96 percent tensile strain in the seam splashing region of the belt represents a 63 percent increase in stress placed upon the seam splashing region of the belt.

Under dynamic fatiguing conditions, the seam provides a focal point for stress concentration and becomes the initial point of failure in the mechanical integrity of the belt. Thus, the splashing tends to shorten the mechanical life of the seam and service life of the flexible member belt in copiers, duplicators, and printers.

Although a solution to suppress the seam cracking/ delamination problems has been successfully demonstrated, as described in a prior art, by a specific heat treatment process of a flexible electrophotographic imaging member belt with its seam parked directly on top of a 19 mm diameter back support rod for stress-releasing treatment at a temperature slightly above the glass transition temperature (Tg) of the charge transport layer of the imaging member, nevertheless this seam stress release process was also found to produce various undesirable effects such as causing seam area imaging member set and development of belt ripples in the active electrophotographic imaging zones of the belt (e.g., the region beyond about 25.2 millimeters from either side from the midpoint of the seam). Moreover, the heat treatment can induce undesirable circumferential shrinkage of the imaging belt. The set in the seam area of an imaging member mechanically adversely interacts with the cleaning blade and impacts cleaning efficiency. The ripples in the imaging member belt manifest themselves as copy printout defects. Further, the heat induced imaging belt dimensional shrinkage alters the precise dimensional specifications required for the belt. Another key shortcoming associated with the prior art seam stress release heat treatment process is the extensive heat exposure of a large seam area. This extensive heat exposure heats both the seam area of the belt as well as the rod supporting the seam. Since the belt must be cooled to below the glass transition temperature of the thermoplastic material in the belt prior to removal from the support rod in order to produce the desired degree of seam stress release in each belt, the heat treatment and cooling cycle time is unduly long and leads to very high belt production costs.

Therefore, there is an urgent need for improving the mechanical characteristics of seamed flexible imaging belts which can withstand greater dynamic fatiguing conditions and extend belt service life free from any associated shortfalls.

INFORMATION DISCLOSURE STATEMENT

U.S. Pat. No. 5,240,532, issued to Yu on Aug. 31, 1993—A process for treating a flexible electrostatographic imaging web is disclosed including providing a flexible base layer and a layer including a thermoplastic polymer matrix comprising forming at least a segment of the web into an arc having a radius of curvature between about 10 millimeters and about 25 millimeters measured along the inwardly facing exposed surface of the base layer, the arc having an imaginary axis which traversed the width of the web, heating at least the polymer matrix in the segment to at least the glass transition temperature of the polymer matrix, and cooling the imaging member to a temperature below the glass transition temperature of the polymer matrix while maintaining the segment of the web in the shape of the arc.

U.S. Pat. No. 376,491 to Krumberg et al., issued Dec. 27, 1994—An organic photoconductor is disclosed including a base layer formed of a first material and a photoconductive layer formed of a second material. The organic photoconductor being characterized in that when it is maintained in a curved orientation with the photoconductive layer facing outward, the photoconductive layer is subjected to less stress than the base layer. In one embodiment the first material is relatively more flexible and stretchable than said second material and the materials are pre-stressed in opposite senses. In a second embodiment the first material is relatively flexible and stretchable and the second material is an initially less flexible and stretchable material which has been chemically treated to increase its stretchability and flexibility.

U.S. Pat. No. 5,578,227, issued to J. Rabinovich, issued Nov. 26, 1996 A model making method and apparatus are disclosed which projects a linearly polarized laser beam from a laser source onto a mirror for circularly polarizing the beam and directing the circularly polarized beam vertically toward a rectilinearly movable stage for fusing a rectangular wire to a substrate or a previously fused wire layer on the stage. The circularly polarized beam projects through a center of a spool and a rotary stage and a support for the rotary stage and a rotary arm which is mounted on the rotary stage. The rotary arm supports a stepper feeder which draws the wire from the spool and pushes the wire through a nozzle, which radiuses the wire so that it lies flat and releases the wire near a focused spot of the circularly polarized laser beam. The rotating arm carries a lens mount on a pivot so that the lens which focuses the beam may traverse the wire for cutting the wire. Movement of the rectilinearly movable stage in a X-Y direction is controlled by a computer and stepper motors to follow a predetermined pattern of a cross-section of the model. The rotary arm turns on the rotary stage to release the wire tangentially to curvatures in the model outline. After each complete layer, the stage is stepped downward one wire thickness and the next layer is formed. The nozzle includes a gas jet passage for flooding the wire with inert gas as it is fused.

U.S. Pat. No. 5,021,109 to Petropoulous et al., issued Jun. 4, 1991—A process is disclosed for preparing a multilayered belt comprising the steps of: (1) heating a substrate in a form of a tubular sleeve and formed of a polymeric material to at least about a glass transition temperature of the polymeric material, so as to expand the tubular sleeve; (2) placing the expanded tubular sleeve on a mandrel; (3) treating the tubular sleeve by applying one or more multilayered composite belts; (4) layers on the sleeve to form a heating composite belt to at least about the glass transition temperature of the polymeric material of the tubular sleeve; and (5) cooling the composite belt.

U.S. Pat. No. 5,603,790 to Rhodes, issued Feb. 18, 1997—Process and apparatus for fabricating belts are disclosed. The process includes conveying the leading edge of a flexible web from a supply roll past a slitting station, slitting the web a predetermined distance from the leading edge to form a web segment having the leading edge at one end and a trailing edge at the opposite end, maintaining the web slack at the location where the web is slit during slitting, overlapping the leading edge and the trailing edge of the web segment to form a joint and welding the joint to permanently join the leading edge and the trailing edge together to form a belt. The apparatus includes means to convey the leading edge of a flexible web from a supply roll past a slitting station, means at the slitting station to slit the web a predetermined distance from the leading edge to form a web segment having the leading edge at one end and a trailing edge at the opposite end, means to maintain the web slack at the location where the web is slit during slitting, means to overlap the leading edge and the trailing edge of the web segment to form a joint and means to weld the joint to permanently join the leading edge and the trailing edge together to form a belt.

U.S. Pat. No. 4,840,873 to Kobayashi et al., issued Jun. 20, 1989—A process is disclosed for producing an optical recording medium comprising the step of heat treating an optical recording medium comprising a plastic substrate having a surface of minutely roughened structure and a thin metal film formed on the surface. The optical recording medium is heated at a temperature within a range which is lower by 80° C. and higher by 60° C. than the glass transition temperature of the plastic substrate.

U.S. Pat. No. 4,532,166 to Thomsen et al., issued Jul. 30, 1985—A welded web is disclosed which is prepared by overlapping a first edge over a second edge, then applying heat necessary to bond the first edge with the second edge. The heating techniques may include ultrasonic welding, radio frequency heating, and the like.

U.S. Pat. No. 3,988,399 to Evans, issued Oct. 26, 1996— Heat recoverable articles are disclosed which have an elongate S-shaped configuration, which later can be wrapped about a substrate. The articles comprise a molecularly oriented unitary polymeric layer which has been differentially annealed while restrained against dimensional change and crosslinking.

CROSS REFERENCE TO RELATED APPLICATIONS

This application is related to the following U.S. patent applications:

U.S. patent application Ser. No. 09/004289, filed on Jan. 8, 1998, in the name of R. Yu et al., entitled "SEAM STRESS RELEASE IN FLEXIBLE ELECTROSTATOGRAPHIC IMAGING BELTS", (Attorney Docket No. D/96182)—A process is disclosed for treating a seamed flexible electrostatographic imaging belt including providing an imaging belt comprising at least one layer comprising a thermoplastic polymer matrix and a seam extending from one edge of the belt to the other, providing an elongated support member having a arcuate supporting surface and mass, the arcuate surface having at least a substantially semicircular cross section having a radius of curvature of between about 9.5 millimeters and about 50 millimeters, supporting the seam on the arcuate surface with the region of the belt adjacent each side of the seam conforming to the arcuate supporting surface of the support member with a wrap angle at least sufficiently enough to provide arcuate support for the seam area, traversing the seam from one edge of the belt to the other with infrared rays from a tungsten halogen quartz bulb focused with a reflector having a hemiellipsoid shape to form a heated substantially circular spot straddling the seam during traverse, the spot having a diameter of between about 3 millimeters and about 25 millimeters, without exceeding the breadth of supported arcuate seam area, to substantially instantaneously heat the thermoplastic polymer matrix in the seam and the region of the belt adjacent each side of the seam directly under the heating spot to at least the glass transition temperature of the polymer matrix without significantly heating the support member, and rapidly quenching the seam by thermal conduction of heat from the seam to the mass of the support member to a temperature below the glass transition temperature of the polymer matrix while the region of the belt adjacent each side of the seam conforms to the arcuate supporting surface of the support member. Apparatus for carrying out this process is also disclosed. The entire disclosure of this application is incorporated herein by reference.

U.S. patent application Ser. No. 09/004290, filed on Jan. 8, 1998, in the name of R. Yu et al., entitled "RAPID ELECTROSTATOGRAPHIC BELT TREATMENT SYSTEM", (Attorney Docket No. D/96182Q2)—A process is disclosed for treating a seamed flexible electrostatographic imaging belt including providing an imaging belt including at least one imaging layer including a thermoplastic polymer matrix and a seam extending from one edge of the belt to the other, the seam having a region on the belt adjacent each side of the seam and also having an exposed surface on each side of the belt, supporting the belt with at least one vacuum holding device spaced from the seam while maintaining the seam and region of the belt adjacent each side of the seam in an arcuate shape having at least a substantially semicircular cross section having a radius of curvature of between about 9.5 millimeters and about 50 millimeters, heating the thermoplastic polymer matrix of the imaging layer in the seam and the region of the belt adjacent each side of the seam to at least the glass transition temperature (Tg) of the thermoplastic polymer matrix without significantly heating the support member, and contacting the exposed surface of the seam and regions on each side of the belt with a gas to rapidly cool the seam and regions on each side of the belt to a temperature below the glass transition temperature of the polymer matrix while maintaining the arcuate shape of the region of the belt adjacent each side of the seam. Apparatus for carrying out this process is also disclosed. The entire disclosure of this application is incorporated herein by reference.

Thus, there is a continuing need for electrostatographic imaging belts having improved resistance to seam cracking and delamination.

SUMMARY OF THE INVENTION

It is, therefore, an object of the present invention to provide an improved electrostatographic imaging belt which overcomes the above-noted deficiencies.

It is yet another object of the present invention to provide a mechanically improved seamed electrostatographic imaging belt.

It is still another object of the present invention to provide an improved electrostatographic imaging belt having an ultrasonically welded seam which exhibits greater resistance to cracking and delamination.

It is another object of the present invention to provide an improved electrostatographic imaging belt having a welded seam which exhibits greater resistance to cracking and delamination and no seam area set.

It is yet another object of the present invention to provide an improved electrostatographic imaging belt having a welded seam which exhibits good dimensional tolerance.

It is also another object of the present invention to provide an improved electrostatographic imaging belt having a welded seam which is free of belt ripple induced copy printout defects.

It is still another object of the present invention to provide an improved electrostatographic imaging belt with a stress free state in the imaging layer around the welded seam area when the electrostatographic imaging belt flexes over small diameter support rollers.

The foregoing objects and others are accomplished in accordance with this invention by providing a process for treating a seamed flexible electrostatographic imaging belt comprising providing an imaging belt having two parallel edges, the belt comprising
 at least one layer comprising a thermoplastic polymer matrix and a seam extending from one edge of the belt to the other, the seam having an imaginary centerline, providing an elongated support member having at arcuate supporting surface and mass, the arcuate surface having at least a substantially semicircular cross section having a radius of curvature of between about 9.5 millimeters and about 50 millimeters, supporting the seam on the arcuate surface with the region of the belt adjacent each side of the seam conforming to the arcuate supporting surface of the support member, precisely traversing the length of the seam from one edge of the belt to the other with thermal energy radiation having a narrow Gaussian wavelength distribution of between about 10.4 micrometers and about 11.2 micrometers emitted from a carbon dioxide laser, the thermal energy radiation forming a spot straddling the seam during traverse, the spot having a width of between about 3 millimeters and about 25 millimeters measured in a direction perpendicular to the imaginary centerline of the seam, and rapidly quenching the seam by thermal conduction of heat from the seam to the mass of the support member to a temperature below the glass transition temperature of the polymer matrix while the region of the belt adjacent each side of the seam conforms to the arcuate supporting surface of the support member.

Although this invention relates to mechanical improvements of electrostatographic imaging member belts, the following will focus on electrophotographic imaging belts to simplify discussion.

A more complete understanding of the process of the present invention can be obtained by reference to the accompanying drawings wherein:

BRIEF DESCRIPTION OF THE DRAWINGS

In the detailed description of the preferred embodiment of the present invention, reference is made to the accompanying drawings, in which.

Figure 1:
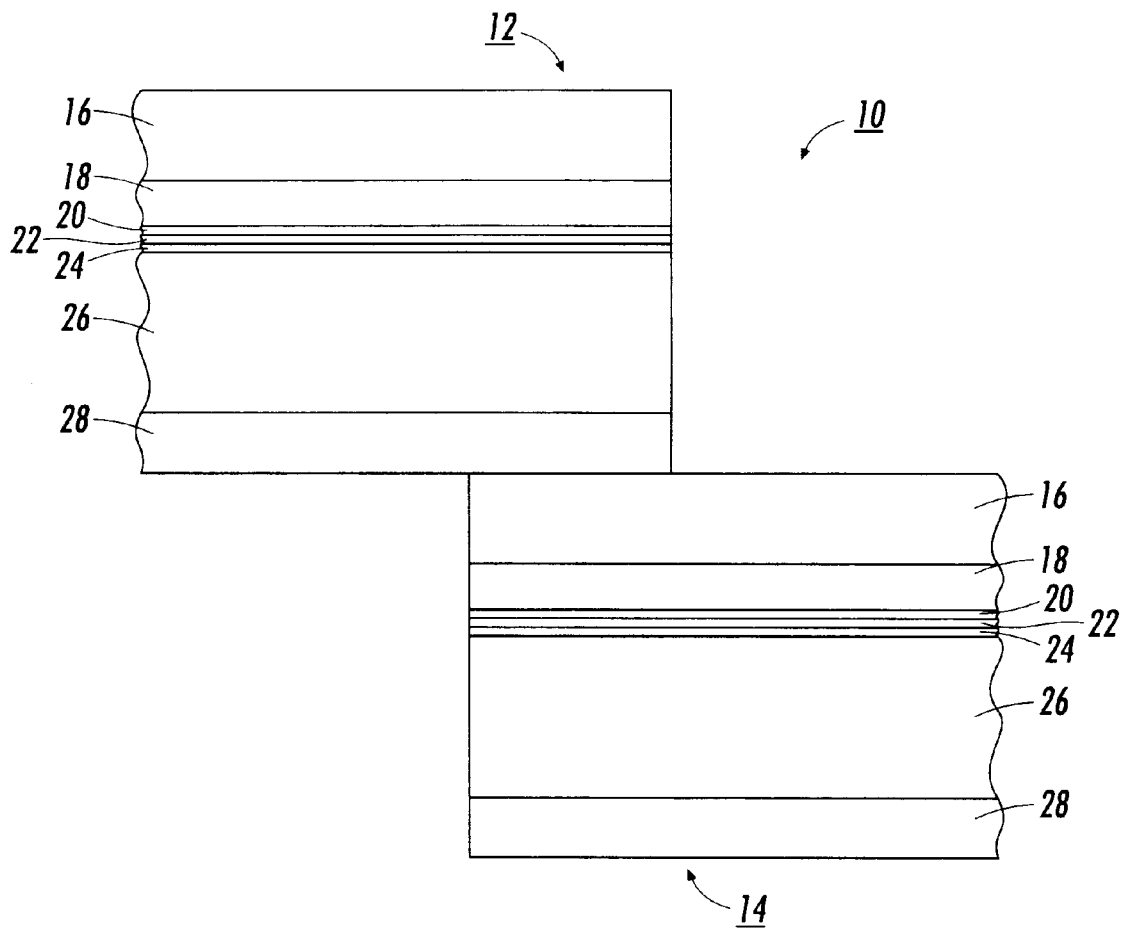
FIG. 1 is a cross-sectional view of a multiple layered flexible sheet of electrophotographic imaging material with opposite ends overlapped.

In the drawings and the following description, it is to be understood that like numeric designations refer to components of like function.

DETAILED DESCRIPTION OF THE PREFERRED EMBODIMENTS

Although specific terms are used in the following description for the sake of clarity, these terms are intended to refer only to the particular structure of the invention selected for illustration in the drawings, and are not intended to define or limit the scope of the invention.

Referring to FIG. 1, there is illustrated a flexible member 10 in the form of a sheet having a first end marginal region 12 overlapping a second end marginal region 14 to form an overlap region ready for a seam forming operation. The flexible member 10 can be utilized within an electrophotographic imaging device and may be a single film substrate member or a member having a film substrate layer combined with one or more additional coating layers. At least one of the coating layers comprises a film forming binder.

The flexible member 10 may be a single layer or comprise multiple layers. If the flexible member 10 is to be a negatively charged photoreceptor device, the flexible member 10 may comprise a charge generator layer sandwiched between a conductive surface and a charge transport layer. Alternatively, if the flexible member 10 is to be a positively charged photoreceptor device, the flexible member 10 may comprise a charge transport layer sandwiched between a conductive surface and a charge generator layer.

The layers of the flexible member 10 can comprise numerous suitable materials having suitable mechanical properties. Examples of typical layers are described in U.S. Pat. Nos. 4,786,570, 4,937,117 and 5,021,309, the entire disclosures thereof being incorporated herein by reference. The belt or flexible member 10 shown in FIG. 1, including each end marginal region 13 and 14, comprises from top to bottom a charge transport layer 16 (e.g., 24 micrometers thick), a generator layer 18 (e.g., 1 micrometer thick), an interface layer 20 (e.g., 0.05 micrometer thick), a blocking layer 22 (e.g., 0.04 micrometer thick), a conductive ground plane layer 24 (e.g., 0.02 micrometer thick, a supporting layer 26 (e.g., 76.2 micrometer thick), and an anti-curl back coating layer 28 (e.g., 14 micrometer thick). It should be understood that the thickness of the layers are for purposes of illustration only and that a wide range of thicknesses can be used for each of the layers.

Figure 2:
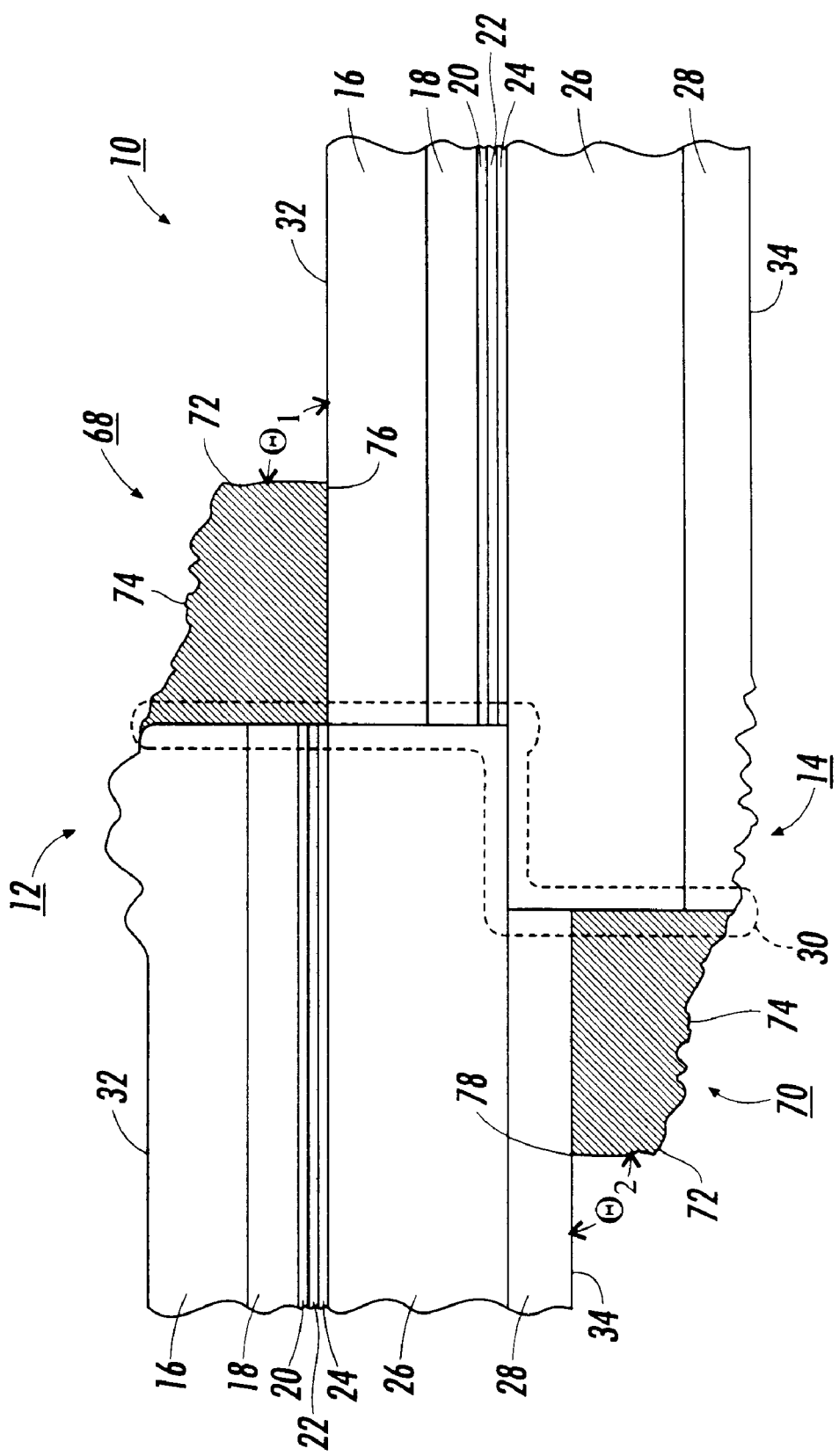
FIG. 2 is a cross-sectional view of a multiple layered seamed flexible electrophotographic imaging belt derived from the sheet of FIG. 1 after ultrasonic seaming welding.

The end marginal regions 12 and 14 can be joined by any suitable means including gluing, taping, stapling, pressure and heat fusing to form a continuous member such as a belt, sleeve, or cylinder. Preferably, both heat and pressure are used to bond the end marginal regions 12 and 14 into a seam 30 in the overlap region as illustrated in FIG. 2. As illustrated in FIG. 2, the location of seam 30 is indicated by a dotted line. Seam 30 comprises two vertical portions joined by a horizontal portion. Thus, the midpoint of seam 30 may be represented by an imaginary centerline extending the length of seam 30 from one edge of belt 10 to the opposite edge, the imaginary centerline (not shown) running along the middle of the horizontal portion which joins the two vertical portions illustrated in FIG. 2. In other words, a plan view (not shown) of the horizontal portion of seam 30 would show a strip much like a two lane highway in which the centerline would be represented by the white divider line separating the two lanes. The flexible member 10 is thus transformed from a sheet of electrophotographic imaging material as illustrated in FIG. 1 into a continuous electrophotographic imaging belt as illustrated in FIG. 2. The flexible member 10 has a first major exterior surface or side 32 and a second major exterior surface or side 34 on the opposite side. The seam 30 joins the flexible member 10 so that the bottom surface 34 (generally including at least one layer immediately above) at and/or near the first end marginal region 12 is integral with the top surface 32 (generally including at east one layer immediately below) at and/or near the second end marginal region 14.

A preferred heat and pressure joining means includes ultrasonic welding to transform the sheet of photoconductive imaging material into a photoreceptor belt. The belt can be fabricated by ultrasonic welding of the overlapped opposite end regions of a sheet. In the ultrasonic seam welding process, ultrasonic energy applied to the overlap region is used to melt suitable layers such as the charge transport layer 16, generator layer 18, interface layer 20, blocking layer 22, part of the support layer 26 and/or anti-curl back coating layer 28. Direct fusing of the support layer achieves optimum seam strength.

Figure 3:
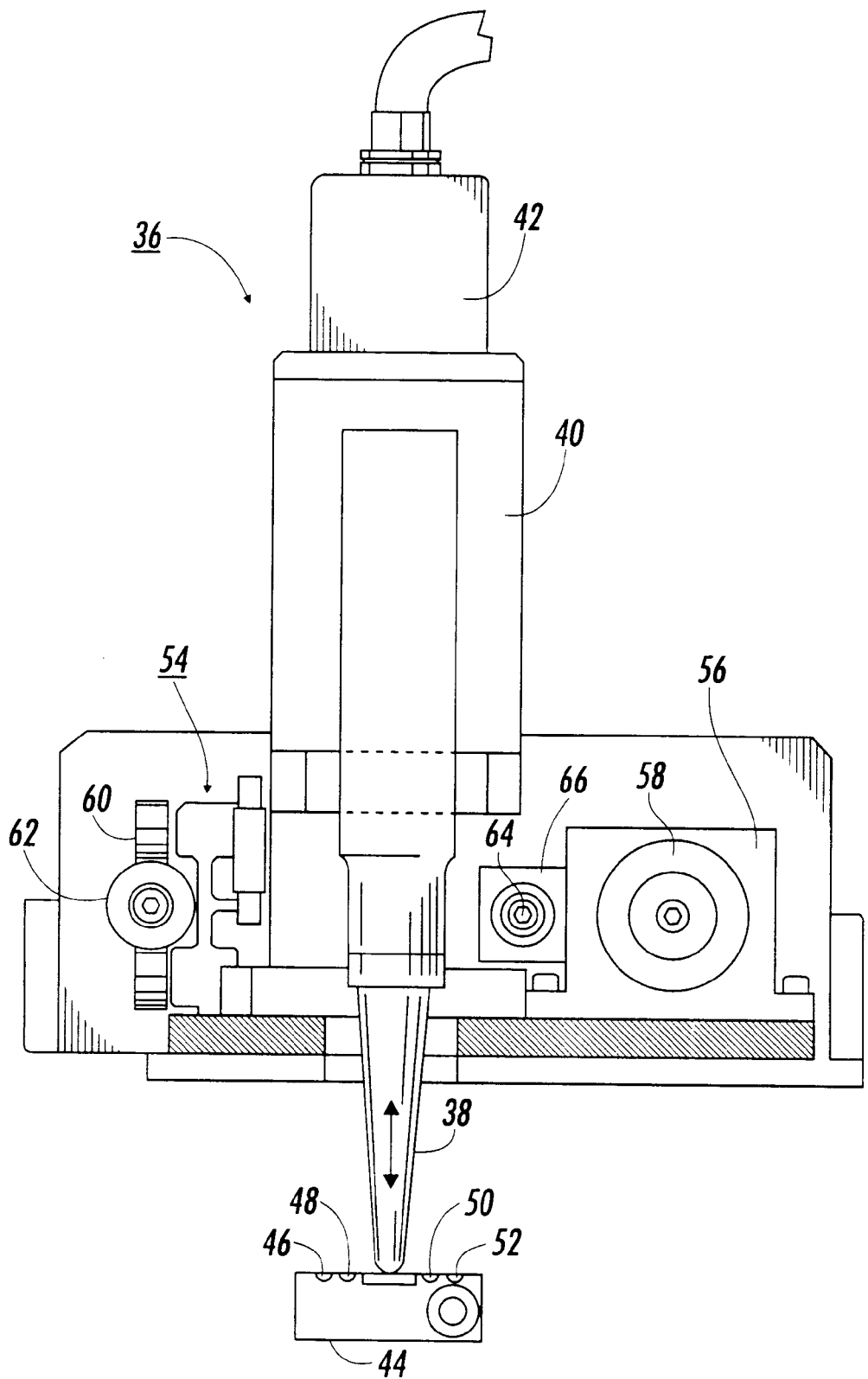
FIG. 3 is a schematic, elevational view of an ultrasonic welding apparatus.

A conventional ultrasonic welding apparatus 36 is shown in FIG. 3. The apparatus 36 comprises an ultrasonic horn 38 which is caused to oscillate along its longitudinal axis by a transducer assembly 40 affixed to the top thereof. A solenoid 42 is mounted above the transducer assembly 40 to extend or retract the ultrasonic horn 38 and the transducer assembly 40 in the vertical direction. The seam 30, (not shown in FIG. 3) formed by the overlapping segment end marginal regions 12 and 14 of the flexible member 10, is supported by the upper surface of anvil 44 and held in place below the path of the ultrasonic horn 38 by suction from parallel rows of grooves 46, 48, 50 and 52. The anvil 44 preferably includes or is connected to a vacuum source for holding down overlapping ends of member 10. The ultrasonic horn 38 and the transducer assembly 40 are supported by the lower end of a vertically reciprocating shaft (not shown) extending from the lower end of the solenoid 42 mounted to the upper hinged half of a substantially horizontally reciprocating carriage 54. One side of the lower hinged half of the carriage 54 is suspended from a pair of pillow blocks 56 which, in turn, slides on a horizontal bar 58. The other side of carriage 54 is suspended from a pair of cam followers 60 that rolls on the outer surface of a horizontal bar 62. A rotatable lead screw 64 drives the horizontally reciprocating carriage 54 through a ball screw 66 secured to the carriage 54. The horizontal bars 58 and 62, as well as the lead screw 64, are secured at each end by a frame assembly (not shown). The lead screw 64 is rotated by a belt driven by an electric motor (not shown) which is also supported by the frame assembly.

When the overlap region formed by the end marginal regions 12 and 14 of the flexible member 10, is positioned on the anvil 44 below the ultrasonic horn 38 at a belt welding station, the solenoid 42 is inactivated to extend the transducer 40 toward the anvil 44 from a retracted position (in which the solenoid 42 is activated). The transducer 40 is activated by the electric motor to drive the lead screw 64 which, in turn, moves the horizontally reciprocating carriage 54 over the seam 30 supported by the anvil 44.

Lowering of the transducer 40 by inactivation of solenoid 42 brings the ultrasonic horn 38 into compressive engagement with an appropriate overlap region, e.g., 0.040 inch of the flexible member 10. The high vibration frequency of the ultrasonic horn 38 along its vertical axis causes the temperature of at least the contiguous overlapping surfaces of the flexible member 10 to increase until at least one layer (e.g., charge transport layer 16) of the flexible member 10 flows, resulting in the formation of a welded seam 30.

Welding of the contiguous overlapping surfaces of the flexible member 10 can best be accomplished if the flexible member 10 comprises layers which flow as a result of the applied energy of ultrasonic oscillations (e.g., charge transport layer 16 and anti-curl back coating layer 28). For optimum seam strength, it is preferable that the layers of the flexible member 10 at the overlap region be brought to the melting stage by the applied ultrasonic energy. In this manner, fusing of support layer 26 can be achieved to form the welded seam 30 as illustrated in FIG. 2. Welding of opposite ends of a sheet to form an electrophotographic belt is well known and described, for example, in U.S. Pat. Nos. 4,838,964, 4,878,985, 5,085,719 and 5,603,790, the entire disclosures thereof being incorporated herein by reference.

The flexible member 10 may be of any suitable thickness which will allow adequate heating of the contiguous overlapping surfaces of the end marginal regions 12 and 14 to cause joining when sufficient heat energy to be applied to the contiguous overlapping surfaces. Any suitable heating technique may be used to provide the heat necessary at the contiguous overlapping surfaces to melt the thermoplastic material and cause it to weld the overlap region of the flexible member 10. Thus, a suitable technique permanently transforms the form of the flexible member 10 from a sheet of electrophotographic imaging material into an electrophotographic imaging belt.

When ultrasonic welding is utilized at the contiguous overlapping region, the flexible member 10 is positioned between the anvil 44 and ultrasonic horn 38. The rapid impact of the first end marginal region 12 against the second end marginal region 14 of the flexible member 10 causes generation of heat. A horn vibration frequency from a range of about 16 KHz or higher may be utilized to cause the flexible member 10 to soften and melt. Since heat is generated very rapidly at the interface of the device, sufficient heat to cause the layers of the flexible member 10 to melt can occur typically in about 1.2 seconds as the horn 38 traverses along the overlap region.

As the horn 38 is lowered to the overlap region of the flexible member 10, electrical power is supplied to the transducer 40 and the electric motor (not shown) is activated to drive the lead screw 64 which, in turn, moves the horizontally reciprocating carriage 54 and ultrasonic horn 38 along the overlap region of the flexible member 10. After the carriage 54 completes its traversal of the overlap region, the solenoid 42 is activated to retract the transducer 40 away from anvil 44, the transducer 40 is inactivated, and the electric motor (not shown) is reversed to return the horizontally reciprocating carriage 54 to its starting position. A typical ultrasonic horn traverse speed for the seaming operation can be selected in a range from 1 to 5 inches per second.

Figure 4:
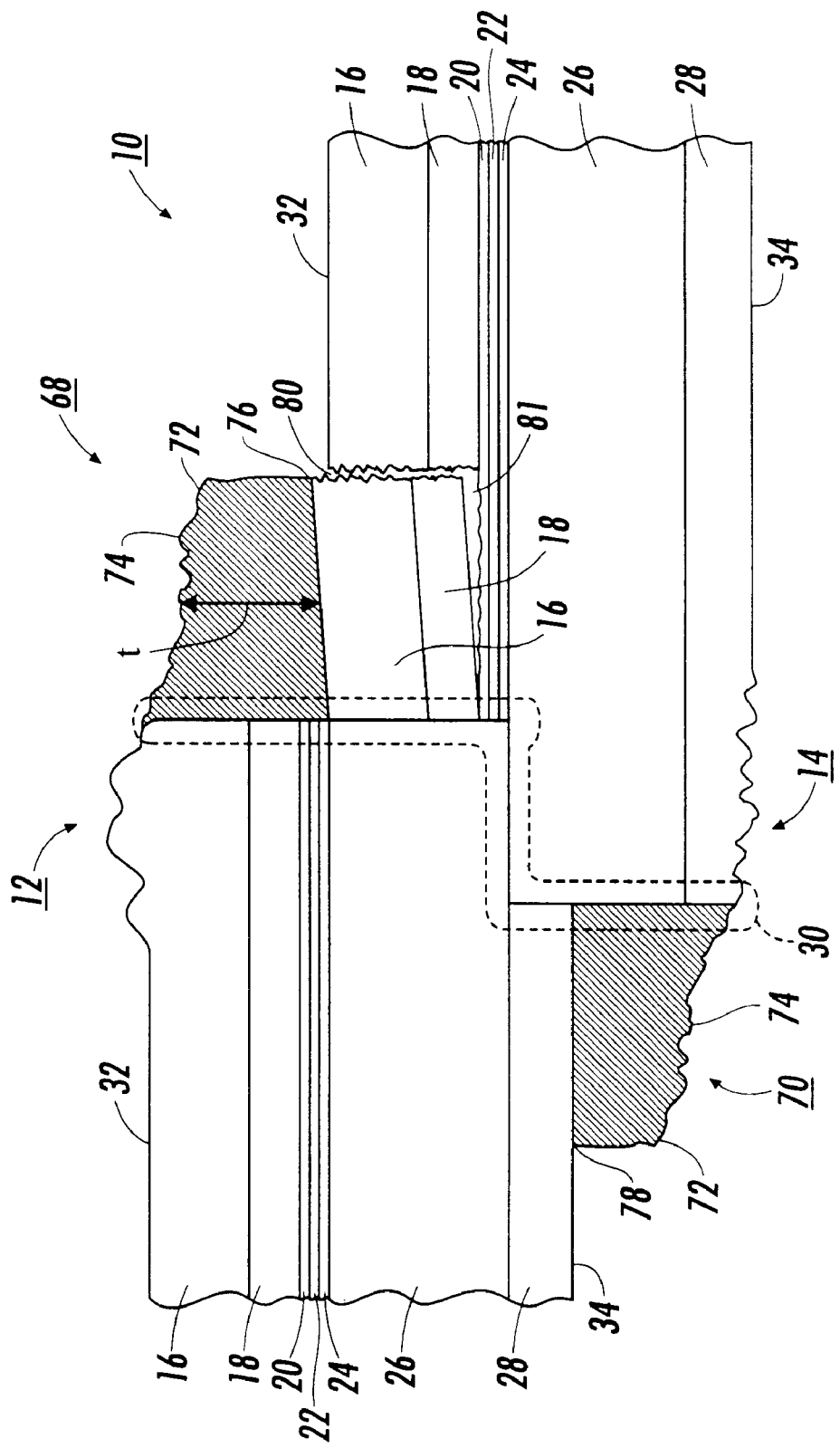
FIG. 4 is a cross-sectional view of a multiple layered seamed flexible electrophotographic imaging belt which has failed due to seam cracking and delamination.

Upon completion of the welding of the overlap region into a seam 30, the overlap region is transformed into an overlapping and abutting region as illustrated in FIGS. 2 and 4. Within the overlapping and abutting region, the portions of the flexible member 10, which once formed the end marginal regions 12 and 14, are joined by the seam 30 such that the once end marginal regions 12 and 14 are overlapping and abutting one another. The welded seam 30 contains upper and lower splashings 68 and 70 at each end thereof as illustrated in FIGS. 2 and 4. The splashings 68 and 70 are formed in the process of joining the end marginal regions 12 and 14 together. Molten material is necessarily ejected from either side of the overlap region to facilitate direct support layer 26 to support layer fusing and results in the formation of the splashings 68 and 70. The upper splashing 68 is formed and positioned above the overlapping end marginal region 14 abutting the top surface 32 and adjacent to and abutting the overlapping end marginal region 12. The lower splashing 70 is formed and positioned below the overlapping end marginal region 12 abutting bottom surface 34 and adjacent to and abutting the overlapping end marginal region 14. The splashings 68 and 70 extend beyond the sides and the edges of the seam 30 in the overlap region of the welded flexible member 10. The extension of the splashings 68 and 70 beyond the sides and the edges of the seam 30 is undesirable for many machines such as electrophotographic copiers, duplicators and copiers that require precise edge positioning of a flexible member 10 during machine operation. Generally, the extension of the splashings 68 and 70 at the belt edges of the flexible member 10 are removed by a notching operation.

A typical splashing has a thickness of about 68 micrometers. Each of the splashings 68 and 70 has an uneven but generally rectangular shape including one side (free side) 72 (which forms a free end) extending inwardly from an outwardly facing side 74 (extending generally parallel to either the top surface 32 or the bottom surface 34). The free side 72 of the splashing 68 forms an approximately perpendicular angle $\theta_1$ with the bottom surface 34 of the flexible member 10. Likewise, the free side 72 of the splashing 70 forms an approximately perpendicular angle $\theta_2$ meeting or junction point 76 exists at the junction of the free side 72 of the upper splashing 68 and the top surface 32 of the flexible member 10. Likewise, a meeting or junction point 78 exists at the junction of the free side 72 of the lower splashing 70 and the bottom surface 34 of the flexible member 10. Both junction points 76 and 78 provide focal points for the stress concentration and become the initial points of failure affecting the mechanical integrity of the flexible member 10.

During machine operation, the seamed belt flexible member 10 cycles or bends over rollers, particularly small diameter rollers, of a belt support module within an electrophotographic imaging apparatus. In this case, as a result of dynamic bending of the flexible member 10 during dynamic cycling, the rollers exert a force on the flexible member 10 which causes large stress to develop generally adjacent to the seam 30 due to the excessive thickness thereof. The stress concentrations that are induced by bending near the junction points 76 and 78 may reach values much larger than the average value of the stress over the entire length of the flexible member 10. The induced bending stress is inversely related to the diameters of a roller that the flexible member 10 bends over and directly related to the thickness of the seam 30 of the flexible member 10. When a structural member, such as the flexible member 10, contains a sudden increase in cross-sectional thickness at the overlap region, high localized stress occurs near the discontinuity, e.g., junction points 76 and 78.

When the flexible member 10 bends over the rollers of a belt module within an electrophotographic imaging apparatus, the bottom surface 34 of the flexible member 10, which is adapted to contact the exterior surface of the roller, is compressed. In contrast, the top surface 32 is stretched under tension. This is attributable to the fact that the top surface 32 and bottom surface 34 move in a circular path about the circular roller. Since the top surface 32 is at greater radial distance from the center of the circular roller than the bottom surface 34, the top surface 32 must travel a greater distance than the bottom surface 34 in the same time period. Therefore, the top surface 32 must be stretched under tension relative to a generally central portion of the flexible member 10 (the portion of the flexible member 10 generally extending along the center of gravity of the flexible member 10). Likewise, the bottom surface 34 must be compressed relative to the generally central portion of the flexible member 10 (the portion of the flexible member 10 generally extending along the center of gravity of the flexible member 10). Consequently, the bending stress at the junction point 76 will be tension stress, and the bending stress at the junction point 78 will be compression stress.

Compression stresses, such as at the junction point 78, rarely cause seam 30 failure. Tension stresses, such as at junction point 76, however, are much more of a problem. The tension stress concentration at the junction point 76 in great likelihood will eventually result in crack initiation through the electrically active layers of the flexible member 10 as illustrated in FIG. 4. The illustrated crack 80 is adjacent to the top splashing 68 of the second end marginal region 14 of the flexible member 10. The generally vertically extending crack 80 initiated in the charge transport layer 16 continues to propagate through the generator layer 18. Inevitably, the crack 80 extends generally horizontally to develop seam delamination 81 which is propagated through the relatively weak adhesion bond between the adjoining surfaces of the generator layer 18 and the interface layer 20.

The formation of the local seam delamination 81 is typically referred to as seam puffing. The effect of the excess thickness of the splashing 68 and stress concentration at the junction point 76 is to cause the flexible member 10 to perform, during extended machine operation, as if a material defect existed therein. Thus, the splashing 68 tends to promote the development of dynamic fatigue seam 30 failure and can lead to separation of the joined end marginal regions 12 and 14 severing the flexible member 10. Consequently, the service life of the flexible member 10 is shortened.

In addition to seam failure, the crack 80 acts as a depository site and collects toner, paper fibers, dirt, debris and other unwanted materials during electrophotographic imaging and cleaning of the flexible member 10. For example, during the cleaning process, a cleaning instrument, such as a cleaning blade, will repeatedly pass over the crack 80. As the site of the crack 80 becomes filled with debris, the cleaning instrument dislodges at least some portion of this highly concentrated level of debris from the crack 80. The amount of the debris, however, is beyond the removal capacity of the cleaning instrument. As a consequence, the cleaning instrument dislodges the highly concentrated level of debris but cannot remove the entire amount during the cleaning process. Instead, portions of the highly concentrated debris is deposited onto the surface of the flexible member 10. In effect, the cleaning instrument spreads the debris across the surface of the flexible member 10 instead of removing the debris therefrom.

In addition to seam failure and debris spreading, the portion of the flexible member 10 above the seam delamination 81, in effect, becomes a flap which moves upwardly. The upward movement of the flap presents an additional problem during the cleaning operation. The flap becomes an obstacle in the path of the cleaning instrument as the instrument travels across the surface of the flexible member 10. The cleaning instrument eventually strikes the flap when the flap extends upwardly. As the cleaning instrument strikes the flap, great force is exerted on the cleaning instrument which can lead to damage thereof, e.g., excessive wear and tearing of the cleaning blade.

In addition to damaging the cleaning blade, the striking of the flap by the cleaning instrument causes unwanted vibration in the flexible member 10. This unwanted vibration adversely affects the copy/print quality produced by the flexible member 10. The copy/print is affected because imaging occurs on one part of the flexible member 10 simultaneously with the cleaning of another part of the flexible member 10.

Vibration problems encountered with the flexible member 10 is not exclusively limited to a flexible member 10 undergoing seam delamination 81. The discontinuity in cross-sectional thickness of the flexible member 10 at junction points 76 and 78 also can also create unwanted vibration, particularly when the flexible member 10 bends over small diameter rollers of a belt module or between two closely adjacent rollers.

Figure 5:
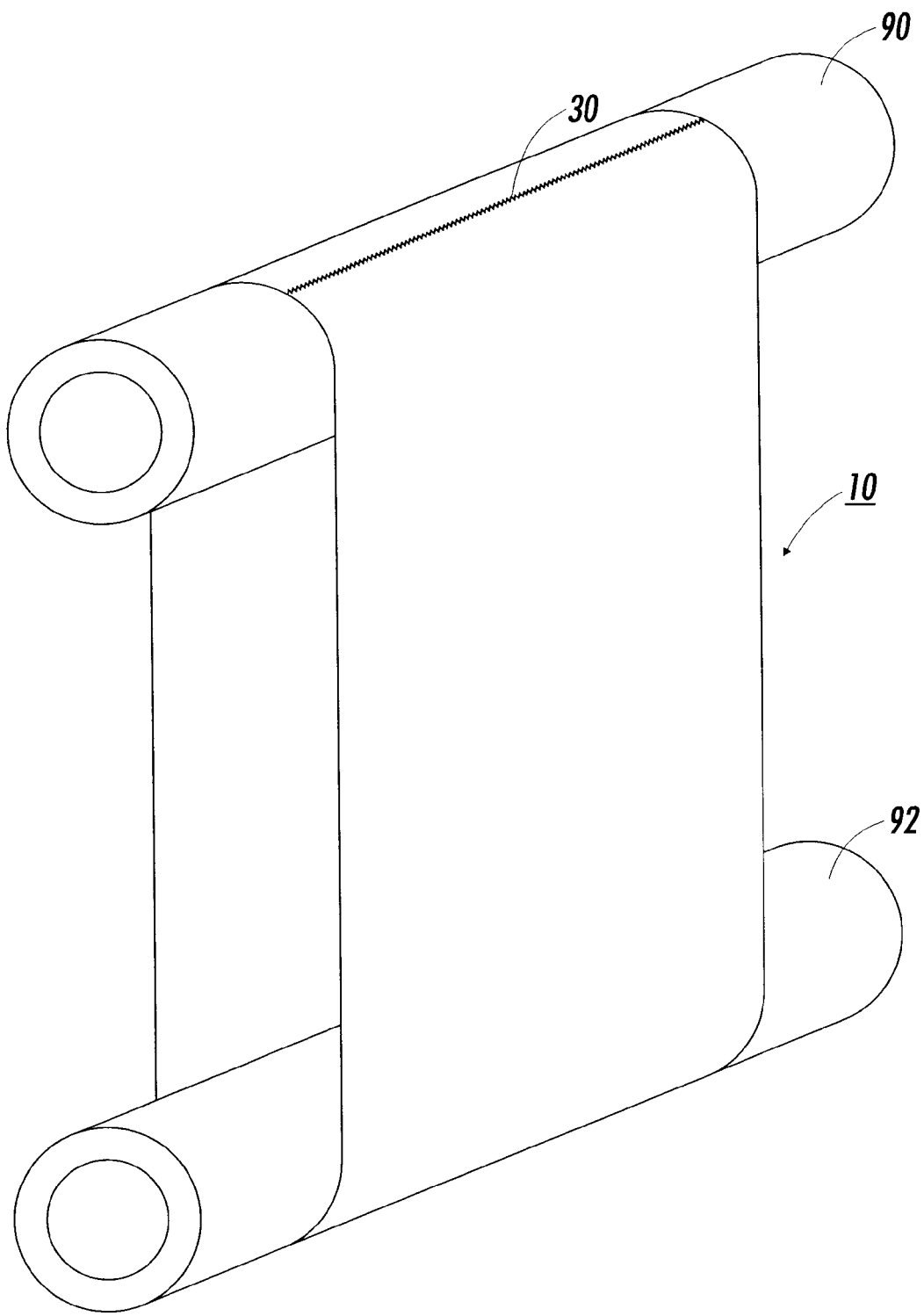
FIG. 5 is an isometric schematic view of a seamed flexible electrophotographic imaging belt in which the belt seam is positioned over a cylindrical tube, the belt being tensioned by the weight of a second cylindrical tube for seam heat treatment in accordance with prior art processing.

Illustrated in FIG. 5 is a belt 10 mounted directly on a supporting cylindrical tube 90 having an outer radius of curvature between about 9.5 millimeters and about 50 millimeters (i.e. diameter of curvature of between about 19 millimeters and about 100 millimeters). When the diameter of curvature chosen for seam heat treatment is less than about 9.5 millimeters (i.e. diameter of curvature of about 19 millimeters), the beam rigidity of the electrophotographic imaging belt will render extremely difficult any effort to bending of the belt 10 to achieve a very small curvature prior to heat treatment. When the radius of curvature is greater than about 50 millimeters (i.e. diameter of curvature of about 100 micrometers), the benefits of the present invention are not fully realized because no significant seam stress release in the imaging layer is achieved. As shown in FIG. 5, the electrophotographic imaging belt 10 may be positioned with belt seam 30 parked directly over supporting cylindrical tube 90, the arcuate surface of tube 90 being in intimate contact with the back surface of belt 10 and the imaging surface of belt 10 facing outwardly away from tube 90. To ensure intimate contact and conformance of the belt with about half of the tube 90, a slight tension is applied to the belt 10 by inserting a light weight cylindrical tube 92 inside the lower loop of belt 10 while the belt 10 is hanging from tube 90. Tube 90 may be cantilevered by securing one end to a supporting wall or frame. The radius of curvature of tube 90 can vary from about 9.5 millimeters to any larger dimension of about 50 millimeters. A desirable wrapped angle for the seam segment parking over the back supporting cylindrical tube 90 should provide an arcuate area at the seam region at least about as wide as the incident laser beam spot. It is preferred that the wrap angle encompassing the seam and region of the belt adjacent each side of the seam conforming to the arcuate supporting surface of the support member be between about 10 degrees and about 180 degrees. The material used for tube 90 and tube 92 may be of any suitable material, including for example, metal, plastic, composites, and the like. With the schematic arrangement described in FIG. 5, a heating element or source (not shown) is positioned directly above the supporting cylindrical tube 90 to provide heat energy for the seam stress release heat treatment process. Since the heating means employed in prior art seam heat treatment processes are usually a hot air impingement source, a toaster oven type heater comprising hot wire filaments or a quartz tube, since the entire seam length area directly under heat exposure is large, and since the belt support member underlying the seam has mass, a lengthy time is required for the seam area to reach the seam stress release temperature and a long time is required for cooling of the seam area and belt support member. Moreover, the typical heat source used for the prior art seam heat treatment process emits a broad band of infrared radiant heat which requires several minutes of elapsed time to complete a heating/cooling processing cycle.

These prior approaches caused heating of the supporting cylindrical member which retarded cooling rates for belt after heating. Furthermore, if a heat source were a laser, there are a vast number of different kinds of lasers, some of which are unsuitable and some which may perform poorly. For example, there are frequency doubled lasers, rare gas lasers such as an argon laser, argon/krypton laser, neon laser, helium neon laser, xenon laser and krypton laser, carbon monoxide laser, carbon dioxide laser, metal ion lasers such as cadmium ion laser, zinc ion laser, mercury ion laser and selenium ion laser, lead salt laser, metal vapor lasers such as copper vapor laser and gold vapor laser, nitrogen laser, ruby laser, iodium laser, neodymium glass laser, neodymium YAG laser, KTP laser, dye lasers such as a dye laser employing Rhodamine 640, Kitom Red 620 or Rhodamine 590 Dye, doped fiber laser, and the like. Different lasers produce dramatically different results. Thus, for example, when a green laser having a 532 nanometers wavelength is employed, the desired seam stress release is not obtained and imaging member discoloration is observed. Similarly, when a neodymium YAG laser having a wavelength of 1.06 micrometers is used, ineffective seam stress release is encountered because the radiant energy absorbed causes material ablation which, in turn, adversely alters the crucially important physical integrity of the seam. Other lasers, such as the excimer laser using rare gas halides, emits ultraviolet radiation which is deemed unsuitable for the seam treatment purpose because it does not provide thermal energy at all to effect seam stress release but rather causes material excitation leading to fragmentation of polymer chains and vaporization of seam material. Argon lasers emit radiation having a wavelength between 400 nanometers to 500 nanometer.

Figure 6:
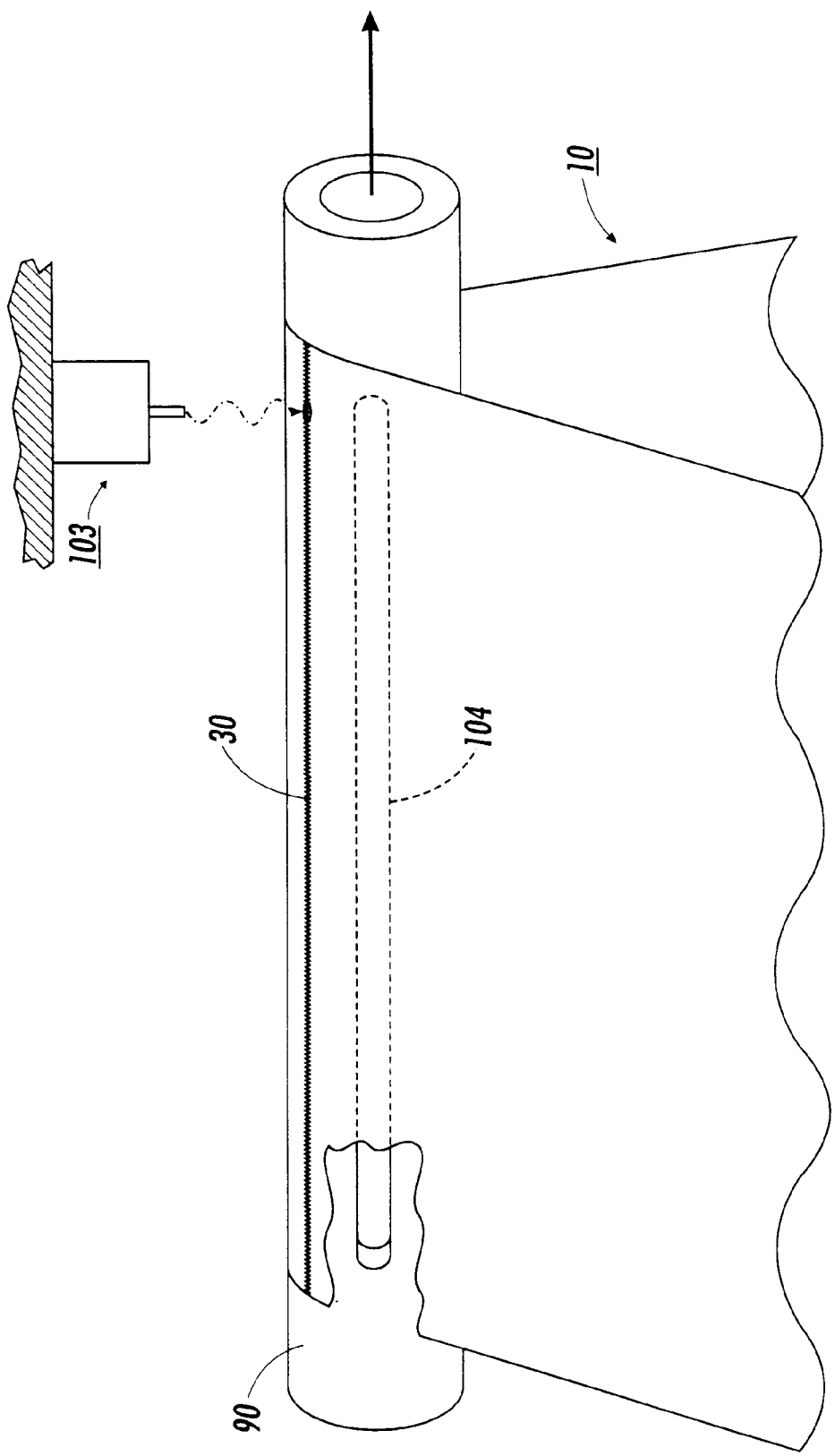
FIG. 6 is an isometric schematic view of a seamed flexible electrophotographic imaging member belt in which the seam is parked on and held against the arcuate surface of an elongated support member by vacuum while subjected to the seam stress-release process of the present invention.

In sharp contrast, the process of the present invention, as illustrated in FIG. 6, utilizes a sealed carbon dioxide laser 103 to provide localized heating of only a small substantially circular spot straddling the seam 30 while the seam of imaging member belt 10 is parked at about the 12 o'clock position of a hollow support tube 90. Instead of a weight cylinder 92 (see FIG. 5) to provide belt tension, a narrow slot 104 [e.g. having a width of about 0.06 inch (1.5 millimeters)] is used on each side of the hollow support tube 90 to hold the belt 10 against the arcuate surface of tube 90. The slots 104 are about 180 degrees apart and extend axially along each side of tube 90. One end of tube 90 is sealed (not shown) and the other is connected by a suitable device such as a valved flexible hose (not shown) to any suitable vacuum source. After belt 10 is placed on tube 90 manually or by any suitable conventional robotic device, the initially closed valve on the flexible hose to the vacuum source is opened to suck belt 10 against the upper arcuate semicircular surface of tube 90 and to achieve a substantially 180 degree wrap of belt 10 around the upper arcuate semicircular surface of tube 90. Plugs, seals, end-caps, or the like may be used to close the end openings of supporting tube 90 to ensure vacuum buildup. If desired, a plurality of holes of any suitable shape (e.g. round, oval, square, and the like) may be used instead of or in addition to the slots 104. The size of the slots and holes should be small enough to avoid distortion of the belt during the heating and cooling steps. The resistance of the belt to distortion when suction is applied depends on the beam strength of the specific belt employed which in turn depends upon the specific materials in and thickness of the layers in the belt. The sealed carbon dioxide laser 103 emits a narrow Gaussian distribution wavelength between about 10.4 micrometers and about 11.2 micrometers. The peak radiant energy wavelength emitted by the sealed carbon dioxide laser 103 is about 10.64 micrometers. Generally, pulse type radiation is preferred over continuous wave irradiation because delivery of a series of pulses provides an addition control over the interaction absorption of radiation and the overall process. This leads to more control of the heating and the degree of damage to the layer materials. The combination of using a power density of from about 0.01 watt per square millimeter to about 0.71 watt per square millimeter, a pulse duration between about 30 microseconds and about 150 microseconds, and a frequency range from about 50 hertz to about 200 hertz gives satisfactory seam stress release heat treatment results without melting, vaporization or cutting through of the seam components during the heat treatment. The specific combination utilized depends upon the specific materials being heated and the relative rate of traverse. Sealed carbon dioxide ($CO_2$) lasers are commercially available. A typical commercially available high powered sealed carbon dioxide laser heating source is a Model Diamond 64 sealed carbon dioxide laser from Coherent, Inc. which is a slab laser comprising a pair of spaced apart, planar electrodes having opposed light reflecting surfaces. The spacing of the electrodes is arranged such that light will be guided in a plane perpendicular to the reflecting surfaces. In contrast, the light in the plane parallel to the light reflecting surfaces is allowed to propagate in free space and is only confined by a resonator. Preferably, the lasing medium is standard $CO_2$ lasing mixture including helium, nitrogen and carbon dioxide with a 3:1:1 ratio plus the addition of five per cent xenon. The gas is maintained between 50 and 110 torr and preferably on the order of about 80 torr. The gas is electrically excited by coupling a radio frequency generator between the electrodes. A typical sealed carbon dioxide laser is described, for example, in U.S. Pat. No. 5,123,028, the entire disclosure thereof being incorporated herein by reference. Sealed carbon dioxide lasers are also described in U.S. Pat. Nos. 5,353,297, 5,353,297 and 5,578,227, the entire disclosures thereof also being incorporated herein by reference. Although this sealed carbon dioxide laser has a 150 watt capability, it is adjusted to only deliver a lower output of, for example, about 6 watts for the seam heat treatment process of this invention. A phase shift mirror may be used to transform a laser beam with linear polarization into a beam with circular polarization. To obtain a circularly polarized beam a phase shift mirror is positioned with an incidence angle of 45 degrees and the laser beam output with a plane of polarization parallel to the laser base is rotated 45 degrees to the plane of incidence. The resulting circularly polarized beam is focused with an image lens into a desired size small spot on the outer surface of the seam. A Melles Griot Zinc Selenide Positive Lens with focal distance 63.5 mm (2.5 inches) may be used as the image lens. In the process of the present invention, all of the radiant energy spot emission from the carbon dioxide laser 103 strikes the seam and regions of the imaging belt immediately adjacent the seam to deliver instant heating and quick cooling as the belt 10 with the supporting cylindrical 90 traverses under the laser heating source.

Generally the raw laser beam emitted from a laser has a circular cross section. The diameter of a raw beam emitted by a laser is normally constant along the entire length of the beam. The thermal energy radiation emitted from a carbon dioxide laser is directed at the seam of the belt and the thermal energy radiation from the laser forms a spot straddling the seam during traverse of the seam. The spot on the surface of the seam preferably has a width of between about 3 millimeters and about 25 millimeters measured in a direction perpendicular to the imaginary centerline of the seam. For example, the Model Diamond 64 sealed carbon dioxide laser from Coherent, Inc. has a circular raw beam having a diameter of about 6 millimeters. This raw laser beam will form a spot having a diameter of about 6 millimeters on the belt seam. If desired, the 6 millimeter spot size of the thermal energy striking the outer surface of the seam can be reduced for small seam area heat exposure by masking the emitted raw laser beam using any suitable device such as a metal template, to give a 3 millimeter to 6 millimeter heat spot size measured in a direction perpendicular to the imaginary centerline of the seam. Although the template may alter the spot shape to any suitable and desired shape such as an oval, square, rectangle and the like, a spot having a circular spot is preferred. Moreover, where for example, the laser beam has a diameter of about 6 millimeter in a larger heat spot is desired on the outer surface of the belt seam, the laser beam may be defocused using any suitable device such as a zinc selenide lens between the laser beam source and the belt seam. Thus, by varying the relative distances between the laser beam source, the lens and the belt seam, the 6 millimeter diameter laser beam may be defocused to give a larger spot having a diameter greater than about 6 millimeters and preferably less than about 25 millimeters in diameter measured in a direction perpendicular to the imaginary centerline of the seam for stress release treatment of large seam areas. If a mask is employed to change the shape of the raw laser beam or the defocused beam to form a spot shape other than round, the preferred spot size that straddles the seam is between about 3 millimeters and about 25 millimeters measured in a direction perpendicular to the imaginary centerline of the seam. Since the carbon dioxide laser delivers constant diameter raw beam, the physical distance from the seam surface of the imaging belt to the laser is not critical for the heat treatment process of this invention, if the intended seam heat treatment spot size is the same as the diameter of the raw laser beam or smaller than the raw laser beam by using a masking template. The carbon dioxide laser spot substantially instantaneously elevates the temperature of only a small localized region of the imaging layer of the imaging member belt, which is in the upper portion of the seam area, above the glass transition temperature (Tg). Typically, the Tg of a film forming polymer used for electrostatographic imaging layer coating applications is at least about 45° C. to satisfy most imaging belt machine operating conditions. Preferably, the heat treatment is carried out between about the Tg and about 25° C. above the Tg of the imaging layer to achieve sufficient seam stress release. Melting, vaporization or cutting through of the seam components during heat treatment should be avoided.

Because of its bulk and weight, the carbon dioxide laser 103 is preferably stationary during treatment of the belt seam. Thus, tube 90 bearing belt 10 and seam 30 are moved substantially continuously or incrementally under carbon dioxide laser 103 manually or automatically such as by any suitable horizontally reciprocateable carriage system (not shown). Alternatively, the tube 90 bearing belt 10 and seam 30 may be held stationary and the carbon dioxide laser 103 maybe moved substantially continuously or incrementally either manually or automatically such as by any suitable horizontally reciprocateable carriage system (not shown). The horizontally reciprocateable carriage system may be driven by any suitable device such as a lead screw and motor combination, belt or chain drive slide system, and the like. A suitable horizontally reciprocateable carriage, lead screw and motor combination is described with reference to FIGS. 7 and 8 and the welding system illustrated in FIG. 3. Thus, for example, the heating source 103 shown in FIG. 6 may be mounted on the horizontally reciprocating carriage 54 illustrated in FIG. 3 instead of the ultrasonic welding apparatus 36 shown in FIG. 3. Conversely, the cylindrical support member and belt may be mounted on the horizontally reciprocating carriage 54 illustrated in FIG. 3 instead of the ultrasonic welding apparatus 36 shown in FIG. 3. Similar suitable horizontally reciprocateable carriage, lead screw and motor combinations are described in U.S. Pat. Nos. 4,838,964, 4,878,985, 5,085,719 and 5,603,790, the entire disclosures thereof being incorporated herein by reference. If desired, both the heating source and belt with support member may simultaneously be moved to achieve relative movement between each other. The heating source 103 is preferably transported across the width of the belt directly over the entire length of the seam 30 at a speed between about 1 inch (2.54 centimeters) and about 5 inches (12.7 centimeters) per second.

For heat treatment of a flexible imaging member belt having a slanted seam, the heating source may be set to precisely track the seam when traversing the entire belt width. However, it is preferred that the belt is cocked and adjusted such that the seam is positioned without skewing along the top of the support cylindrical tube after belt mounting.

Figure 7:
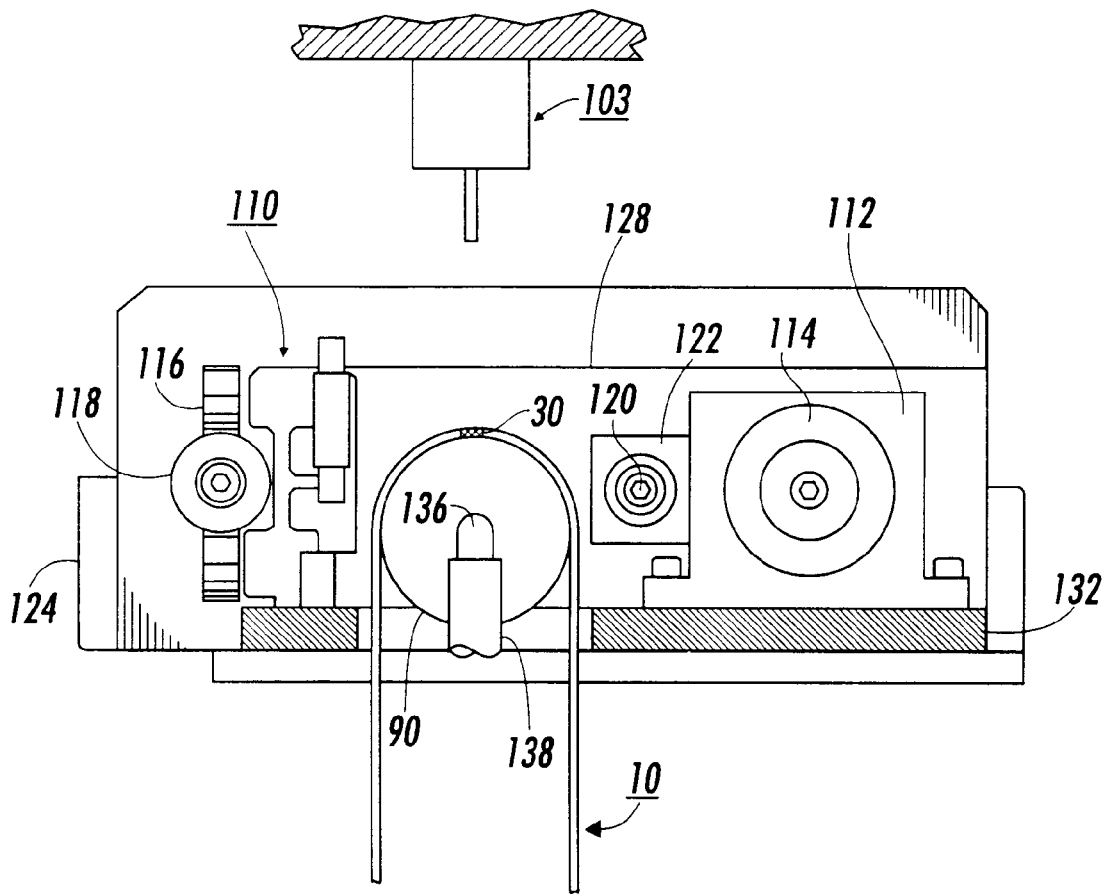
FIG. 7 is a schematic, cross-sectional view of a carriage carrying a welded belt seam parallel to and spaced from a carbon dioxide laser.
Figure 8:
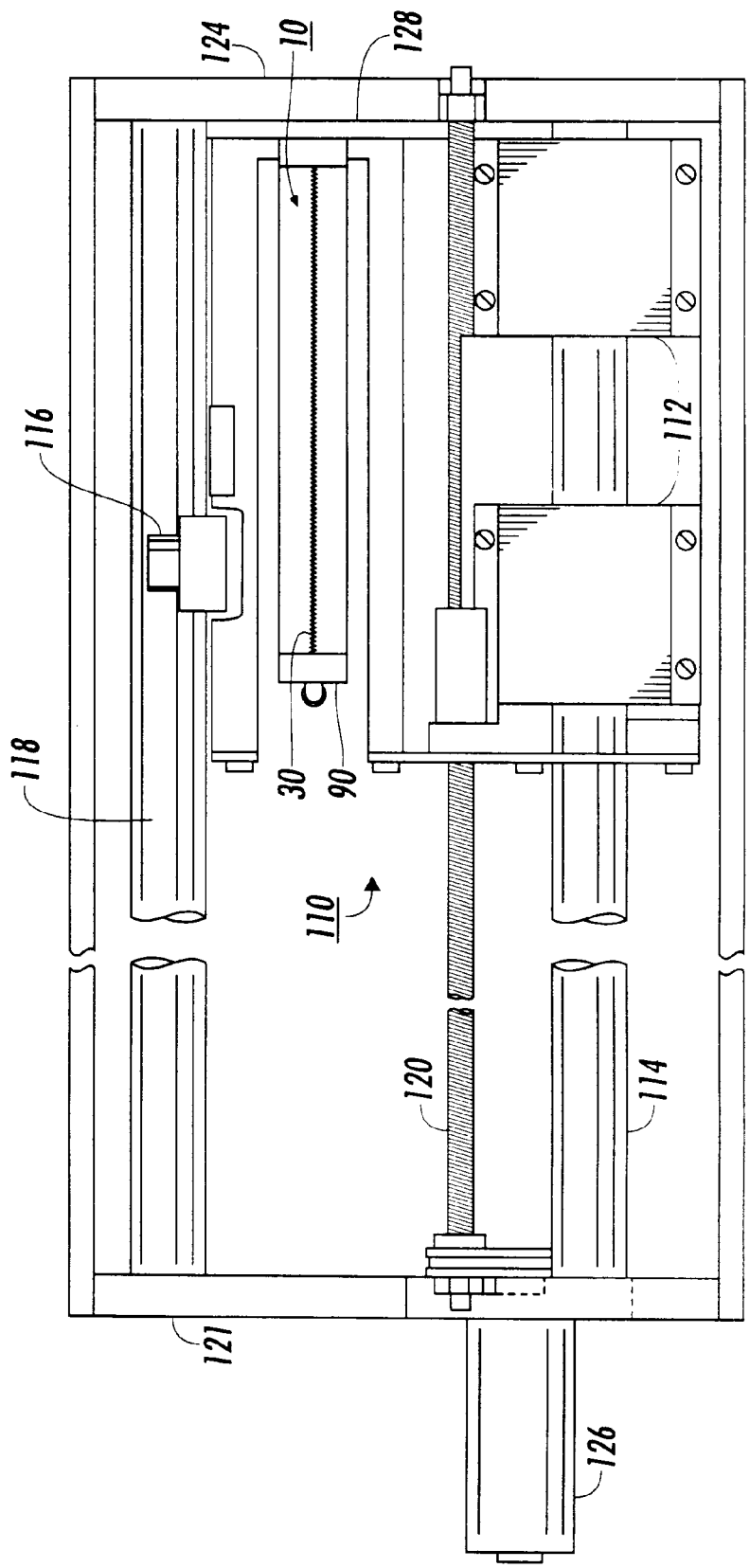
FIG. 8 is a partial schematic plan view of the carriage shown in FIG. 7.

Illustrated in FIGS. 7 and 8 is a substantially horizontally reciprocating carriage 110. One side of the lower half of the carriage 110 is suspended from a pair of pillow blocks 112 which, in turn, slides on a horizontal bar 114. The other side of carriage 110 is suspended from a pair of cam followers 116 that rolls on the outer surface of a horizontal bar 118. A rotatable lead screw 120 drives the horizontally reciprocating carriage 110 through a ball screw 122 secured to the carriage 110. The horizontal bars 114 and 118, as well as the lead screw 120, are secure at each end by a frame assembly 124. The lead screw 120 is rotated by a belt driven by an electric motor 126 which is also supported by the frame assembly 124.

Wall 128 at one end of carriage 110, supports one end of cantilevered hollow support tube 90. Belt 10 is held in intimate contact,with the upper arcuate semicircular surface of tube 90 by suction from vacuum slits 104 (see FIG. 6). a vacuum is supplied to hollow tube 90 through fitting 136 and flexible hose 138. Flexible hose 138 is connected through any suitable manually or electrically activateable valves (not shown) to any suitable vacuum source such as a vacuum tank or vacuum pump (not shown). If desired, a pin stop (not shown) may be installed at the top of tube 90 near the cantilevered end to help position belt 10 on tube 90 prior to opening the valve to the vacuum source. Horizontal movement of the reciprocating carriage 110 is accomplished by activation of electric motor 126 to drive the lead screw 120 which, in turn, moves the horizontally reciprocating carriage 110, tube 90, belt 10 and seam 30 under stationary laser 103. A single pass of reciprocating carriage 110, tube 90, belt 10 and seam 30 under stationary laser 103 is normally sufficient to achieve stress reduction in the seam area of belt 10. After heat treatment, electric motor 126 is reversed to return the horizontally reciprocating carriage 110 to its starting position. Conventional electrical switching is employed to couple, uncouple or reverse electric motor 126 with an electrical power source through suitable circuitry in response to a signal from a suitable programmable controller 56 such as a Allen Bradley Programmable Controller, Model No. 2/05 or Model No. 2/17. If desired, the free end of support member 90 may be supported by any suitable mechanism to minimize movement during any stage of belt treatment. For example, a pin may be used to support the end of support member 90 after belt 10 has been mounted on member 90. The use of pins is disclosed, for example, in U.S. Pat. Nos. 4,838,964, 4,878,985 and 5,085,719, the entire disclosures thereof being incorporated herein by reference.

Since the high intensity infrared spot focused on the surface of seam 30 substantially instantaneously elevates the temperature of only a small localized region of the imaging layer, which is in the upper portion of the seam, and regions of the belt immediately adjacent the seam above the glass transition temperature, the temperature of the underlying support tube 90 remains substantially unaffected under the seam area and more rapid cooling of the heat treated seam can be achieved subsequent to heating. The instant seam heating of a very small area heat source traversal of the seam and rapid cooling are key features which allow the large mass of the back supporting cylinder 90 to serve as a heat sink which quickly quenches the hot seam spot back to room ambient temperature as the heat source is transporting across the entire belt width. With this fast seam heating/cooling combination, the seam stress release heat treatment operation cycle time can be accomplished in a matter of seconds, depending on the belt width of an electrophotographic imaging belt product. This extremely brief treatment cycle time is of crucial importance because it can be integrated into a high volume production process and function synchronously with high speed ultrasonic seam welding operations without adversely impacting belt fabrication/finishing throughput. Furthermore, the process of this invention effectively suppresses heat induced belt circumferential shrinkage and localized seam area set as well as the formation of ripples in the leading and trailing edges of the imaging zones near the seam, typically associated with prior art welded seam belts.

For belts having a seam extending perpendicular to the parallel edges of the belt, the path of the moving seam 30 can be readily transported to precisely track under the beam of carbon dioxide laser 103 until the entire length of seam 30 has been treated. The entire length of seam 30 is located at the top (12 o'clock position) of the back supporting tube 90. However, for skewed seam belts where the seam is not perpendicular to the parallel edges of the belt, only the mid point of the entire seam length would normally be located at the top (12 o'clock position) of the back supporting cylinder 90 when the parallel edges of the belt are arranged perpendicular to the axis of the supporting cylinder 90. Thus, it is preferred to cock the edges of the belt to so that the entire seam length 30 is positioned and parked directly along the top of the back supporting tube 90 prior to heat treatment of the seam.

The seam stress release heat treatment process of this invention is designed for high speed processing. The treating of the flexible electrostatographic imaging belt 10 described above and in the Working Examples below comprises bending the short segment of the electrostatographic imaging belt into an arc having an a substantially semicircular cross section and an imaginary axis which transverses the width of the belt with the seam situated at the middle of the arc. The desired arc may be conveniently formed by parking the flexible electrostatographic imaging belt 10 on the arcuate surface of an elongated support member, the arcuate surface having at least a substantially semicircular cross section having a radius of curvature of between about 9.5 millimeters and about 50 millimeters. The elongated supporting member may simply be a solid or hollow tube or bar. Since the belt 10 need only contact the arcuate surface, the remaining surface of the elongated supporting member may be of any other suitable shape. For example, a bar having a rectangular cross section may be shaped by machining to round off two adjacent corners so that when viewed from one end, half of the bar has a semicircular cross section with no corners and the other half has two of the original 90° corners. It is the rounded part of the bar that provides the arcuate surface.

If desired, temperature sensors may be employed in the support member itself and/or adjacent to the heating source to ensure that sufficient heat energy is applied to raise the temperature of the seam area above the glass transition temperature of the thermoplastic polymer in upper coatings, such as in the charge transport layer of photoreceptors, while avoiding undue heating of the support member.

A typical temperature range for heat treating a flexible photoreceptor belt containing a polycarbonate, with dissolved or molecularly dispersed charge transport compound, charge transport layer having a thickness of about 24 micrometers is between about 180° F. (82° C.) and about 206° F. (97° C.). Cooling of the heat treated seam may be conducted in ambient air with much of the heat being absorbed by the supporting member. Other cooling methods could be used such as chilled water in the supporting tube or cold air blowing onto the material. Generally, the traversing, heating and quenching of a seam are accomplished within about 3 and about 15 seconds with the process of this invention for belts having a width of between about 20 centimeters and about 60 centimeters.

Thus, the process and apparatus of this invention provides a belt in which seam bending stress during dynamic flexing over the rollers of a belt support module is eliminated during image cycling. This stress release in the seam prevents premature seam cracking and delamination in the welded seam area as a belt is cycled over belt module support rollers. It is important to note that after the heat treatment of this invention, cracking has never been seen to be a problem when the seam area is under compression as it cycles through any straight, flat runs between roller supports in an imaging system.

A number of examples are set fort hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and pointed out hereinafter.

EXAMPLE I

An electrophotographic imaging member web was prepared by providing a roll of titanium coated biaxially oriented thermoplastic polyester (Melinex, available from ICI Americas Inc.) substrate having a thickness of 3 mils (76.2 micrometers) and applying thereto, using a gravure applicator, a solution containing 50 parts by weight 3-aminopropyltriethoxysilane, 50.2 parts by weight distilled water, 15 parts by weight acetic, 684.8 parts by weight of 200 proof denatured alcohol, and 200 parts by weight heptane. This layer was then dried to a maximum temperature of 290° F. (143.3° C.) in a forced air oven. The resulting blocking layer had a dry thickness of 0.05 micrometer.

An adhesive interface layer was then prepared by applying to the blocking layer a wet coating containing 5 percent by weight, based on the total weight of the solution, of polyester adhesive (Mor-Ester 49,000, available from Morton International, Inc.) in a 70:30 volume ratio mixture of tetrahydrofuran/cyclohexanone. The adhesive interface layer was dried to a maximum temperature of 275° F. (135° C.) in a forced air oven. The resulting adhesive interface layer had a dry thickness of 0.07 micrometer.

The adhesive interface layer was thereafter coated with a photogenerating layer containing 7.5 percent by volume trigonal selenium, 25 percent by volume N,N'-diphenyl-N,N'-bis(3-methylphenyl)-1,1'-biphenyl-4,4'-diamine, and 67.5 percent by volume polyvinylcarbazole. This photogenerating layer was prepared by introducing 160 gms polyvinylcarbazole and 2,800 mls of a 1:1 volume ratio of a mixture of tetrahydrofuran and toluene into a 400 oz. amber bottle. To this solution was added 160 gms of trigonal selenium and 20,000 gms of ⅛ inch (3.2 millimeters) diameter stainless steel shot. This mixture was then placed on a ball mill for 72 to 96 hours. Subsequently, 500 gms of the resulting slurry were added to a solution of 36 gms of polyvinylcarbazole and 20 gms of N,N'-diphenyl-N,N'-bis(3-methylphenyl)-1,1'- biphenyl-4,4'-diamine dissolved in 750 mls of 1:1 volume ratio of tetrahydrofuran/toluene. This slurry was then placed on a shaker for 10 minutes. The resulting slurry was thereafter applied to the adhesive interface by extrusion coating to form a layer having a wet thickness of 0.5 mil (12.7 micrometers). However, a strip about 3 mm wide along one edge of the coating web, having the blocking layer and adhesive layer, was deliberately left uncoated by any of the photogenerating layer material to facilitate adequate electrical contact by the ground strip layer that is applied later. This photogenerating layer was dried to a maximum temperature of 280° F. (138° C.) in a forced air oven to form a dry thickness photogenerating layer having a thickness of 2.0 micrometers.

This coated imaging member web was simultaneously overcoated with a charge transport layer and a ground strip layer by co-extrusion of the coating materials. The charge transport layer was prepared by introducing into an amber glass bottle in a weight ration of 1:1 N,N'-diphenyl-N,N'-bis(3-methylphenyl)-1,1'-biphenyl-4,4'-diamine and Makrolon 5705, a polycarbonate resin having a molecular weight of about 120,000 commercially available from Farbensabricken Bayer A. G. The resulting mixture was dissolved to give 15 percent by weight solid in methylene chloride. This solution was applied on the photogenerator layer by extrusion to form a coating which upon drying gave a thickness of 24 micrometers.

The strip, about 3 mm wide, of the adhesive layer left uncoated by the photogenerator layer, was coated with a ground strip layer during the co-extrusion process. The ground strip layer coating mixture was prepared by combining 23.81 gms. of polycarbonate resin (Makrolon 5705, 7.87 percent by total weight solids, available from Bayer A. G.), and 332 gms of methylene chloride in a carboy container. The container was covered tightly and placed on a roll mill for about 24 hours until the polycarbonate was dissolved in the methylene chloride. The resulting solution was mixed for 15–30 minutes with about 93,89 gms of graphite dispersion (12.3 percent by weight solids) of 9.41 parts by weight graphite, 2.87 parts by weight ethyl cellulose and 87.7 parts by weight solvent (Acheson Graphite dispersion RW22790, available from Acheson Colloids Company) with the aid of a high shear blade dispersed in a water cooled, jacketed container to prevent the dispersion from overheating and losing solvent. The resulting dispersion was then filtered and the viscosity was adjusted with the aid of methylene chloride. This ground strip layer coating mixture was then applied, by co-extrusion with the charge transport layer, to the electrophotographic imaging member web to form an electrically conductive ground strip layer having a dried thickness of about 14 micrometers.

The resulting imaging member web containing all of the above layers was then passed through a maximum temperature zone of 240° F. (116° C.) in a forced air oven to simultaneously dry both the charge transport layer and the ground strip.

An anti-curl coating was prepared by combining 88.2 gms of polycarbonate resin (Makrolon 5705, available from Goodyear Tire and Rubber Company) and 900.7 gms of methylene chloride in a carboy container to form a coating solution containing 8.9 percent solids. The container was covered tightly and placed on a roll mill for about 24 hours until the polycarbonate and polyester were dissolved in the methylene chloride. 4.5 gms of silane treated microcrystalline silica was dispersed in the resulting solution with a high shear dispersion to form the anti-curl coating solution. The anti-curl coating solution was then applied to the rear surface (side opposite the photogenerator layer and charge transport layer) of the electrophotographic imaging member web by extrusion coating and dried to a maximum temperature of 220° F. (104° C.) in a forced air oven to produce a dried coating layer having a thickness of 13.5 micrometers.

EXAMPLE II

The electrophotographic imaging member web of Example I having a width of 353 millimeters, was cut into 4 separate rectangular sheets of precise 559.5 millimeters in length. The opposite ends of each imaging member were overlapped 1 mm and joined by ultrasonic energy seam welding process using a 40 Khz horn frequency to form 4 seamed electrophotographic imaging member belts. Three of these seamed belts are to be subjected to a seam stress release heat treatment process while the remaining untreated one is used to serve as a control.

Comparative Example III

One of the welded electrophotographic imaging member belts described in Example II was suspended over a horizontally positioned cylindrical back supporting aluminum tube, having a 2-inch (5.08 centimeters) diameter, a wall thickness of about ¼ inch (6.35 millimeters), and an anodized outer surface, with the welded seam parked directly along the top (i.e. 12 o'clock position) of the back support cylindrical tube. Another cylindrical aluminum tube identical to the back supporting cylindrical tube was inserted inside the hanging belt loop so that the tube hangs at the bottom of the loop to ensure conformance of the welded seam to the outer arcuate upper surface of the back supporting cylindrical tube and to provide a 180° wrap angle for the seam area as illustrated in FIG. 5. The temperature of the seam area was raised to about 90° C., 8° C. above the glass transition temperature (Tg) of the charge transport layer, using a hot air impingement technique to represent the prior art heat treatment approach.

Observation with an infrared sensing camera showed that the seam heat treatment process required over 1 minute to reach the desired seam area temperature for softening of the charge transport layer in the seam area to effect seam stress release. Since the supplied heat energy was also being conducted through the belt to the back supporting cylindrical tube, it was noted that the resulting heated seam area required about 1½ minutes of cooling time for the seam to return to ambient room temperature. It was also noted that the prior art seam heat treatment method, if continued for a plurality of belts, could cause a substantial rise in room ambient temperature.

The seam area receiving the heat treatment had a width of about 2 inches over both sides of the seam (i.e. extending a perpendicular distance of 1 inch from the centerline of the seam) and was found to exhibit a substantial amount of imaging member set (i.e. when viewing the seam area from one end of the seam of a belt resting on a flat table top, the treated seam area exhibited a pronounced curve resembling the curvature of the back supporting cylindrical tube).

EXAMPLE IV

The second seamed electrophotographic imaging member belt of Example II was mounted onto the back supporting cylinder for seam heat treatment processing according to the procedure described in Example III, except that the heat source used was a sealed carbon dioxide laser heating source (Model Diamond 64, available from Coherent, Inc.). The treatment processing used an arrangement similar to the schematic illustration shown in FIG. 6. This carbon dioxide laser heating source had a 150 wattage power capability, but for the present seam heat treatment purpose, it was adjusted to deliver an energy output of only 5 watts at a 6 millimeter diameter of raw laser beam spot. An infrared sensing camera was employed to adjust the laser delivery of 150 hertz frequency, 50 microseconds pulse duration, and a seam traversing speed of 2 inches per second (5.08 centimeters per second) to ensure that the seam treatment area temperature was 90° C. which was sufficient to soften the charge transport layer in the seam area to effect seam stress release. The temperature was not so high that it caused problems such as excessive charge transport layer flow, burning of the layers and/or excessive heating of the support tube. The seam area of the imaging member belt was placed on a horizontally movable cantilevered hollow anodized aluminum tube having a ¼ inch (6.4 millimeters) wall thickness, the seam being positioned on the tube in the 12 o'clock position with the seam being parallel to the axis of the tube. The tube contained a pair of slots, one slot at the 9 o'clock position and the other at the 3 o'clock position. Each slot extended along the length of the imaging belt width and was 2 millimeters wide. The free end of the tube was sealed by a cap and the supported end was connected to a flexible hose leading through a valve to a vacuum source. The vacuum source was maintained at a pressure of about 40 mm Hg. The belt in the seam area was held down against the upper surface of the tube when the valve to the vacuum source was opened so that the seam area conformed to the shape of the upper surface of the tube.

The heat source emitted a dominant radiant wavelength of 10.64 micrometers and a substantially circular laser spot of about 6 mm in diameter incident over the seam area for instant seam heating and subsequent quick cooling as the entire width of the imaging member belt and length of the seam was moved under the heat source. At a seam traversal speed of 2 inches (5 centimeters) per second, the entire seam stress release heat treatment process was completed in about seven seconds and the resulting 6 mm width treated seam area did not exhibit a seam area set like that observed in the prior art seam treatment process demonstrated in Comparative Example III.

EXAMPLE V

The third seamed electrophotographic imaging belt of Example II was subjected to the same carbon dioxide laser seam heat treatment process according to the procedures described in Example IV, with the exception that a zinc selenide lens was used to defocus the laser beam in order to give a 15 millimeter diameter incident laser spot on the seam area to effect the heat treatment process. The laser frequency used was 150 hertz, the pulse duration was 115 microseconds, and the relative traversal speed between the stationary spot and moving seam area wit the belt support cylindrical member was 2 inches per second (5.08 centimeters per second).

EXAMPLE VI

The control electrophotographic imaging member belt, the prior art electrophotographic imaging member belt, and the electrophotographic imaging member belts of the present invention as exemplified by Example II, Comparative Example III, Example IV, and Example V, respectively, were each dynamically cycled and print tested in a xerographic machine, having a belt support module comprising a 25.24 mm diameter drive roller, a 25.24 mm diameter stripper roller, and a 29.48 mm diameter tension roller to exert a belt tension of 1.1 pounds per inch. The belt cycling speed was set at 65 prints per minute.

The control non-heat treated belt of Example II was cyclic tested to only about 56,000 prints because the testing had to be terminated due to premature seam cracking/delamination problems.

Although the prior art belt of Comparative Example III, with a 2½ inch (6.25 centimeters) wide heat treated seam, area cycled to 250,000 prints without exhibiting any evidence of seam failure, the appearance of ripples was observed, the ripples having a 500 micrometers peak-to-peak height and a periodicity of about 35 mm in the imaging zones adjacent to the seam heat treatment area after only 40 prints. These ripples caused copy print-out defects during xerographic imaging. Moreover, the large set in the seam heat treat area formed a 0.5 mm surface hump that interacted with a cleaning blade operation thereby impacting the cleaning efficiency of the blade. When measured for dimensional integrity, the seam heat treatment process of Comparative Example III was found to cause a 0.05 percent circumferential belt shrinkage.

When the same belt cycling procedure is repeated with the belt of the present invention (the imaging member of Examples IV and V), no seam failure was observed after 250,000 prints for each laser treated belt. However, in an apparent contrast to the prior art seam heat treatment, the seam stress release heat treatment process of the present invention did not exhibit a belt seam area surface protrusion caused by any set. Moreover, the belt of this invention had no notable ripple appearance in the image zones. Further, the belt of this invention exhibited negligible belt treatment induced belt circumference shrinkage.

In summary, the seam heat stress release process of the present invention resolves seam cracking/delamination problems, provides a very short treatment processing cycle time, avoids seam area heat induced set problems, prevents the appearance of ripples in the imaging zones adjacent to the seam heat treatment area, and produces a dimensionally stable imaging member belt. These results demonstrate clear advantage of the process of this invention over those used by the prior art seam heat treatment processes.

Although the invention has been described with reference to specific preferred embodiments, it is not intended to be limited thereto, rather those having ordinary skill in the art will recognize that variations and modifications may be made therein which are within the spirit of the invention and within the scope of the claims.

What is claimed is:

1. A process for treating a seamed flexible electrostatographic imaging belt comprising
   providing an imaging belt having two parallel edges, the belt comprising
      at least one layer comprising a thermoplastic polymer matrix and
      a welded seam extending from one edge of the belt to the other, the seam having an imaginary centerline,
   providing an elongated support member having at arcuate supporting surface and mass, the arcuate surface having at least a substantially semicircular cross section having a radius of curvature of between about 9.5 millimeters and about 50 millimeters,
   supporting the seam on the arcuate surface with the region of the belt adjacent each side of the seam conforming to the arcuate supporting surface of the support member,
   precisely traversing the length of the seam from one edge of the belt to the other with thermal energy radiation having a narrow Gaussian wavelength distribution of between about 10.4 micrometers and about 11.2 micrometers emitted from a carbon dioxide laser, the thermal energy radiation forming a spot straddling the seam during traverse, the spot having a width of between about 3 millimeters and about 25 millimeters measured in a direction perpendicular to the imaginary centerline of the seam to substantially instantaneously heat the thermoplastic polymer matrix in the seam and the region of the belt adjacent each side of the seam directly under the heating spot to between the glass transition temperature of the polymer matrix and a temperature about 25° C. greater than the glass transition temperature of the polymer matrix, and
   rapidly quenching the seam by thermal conduction of heat from the seam to the mass of the support member to a temperature below the glass transition temperature of the polymer matrix while the region of the belt adjacent each side of the seam conforms to the arcuate supporting surface of the support member.

2. A process according to claim 1 including supporting the seam on the arcuate surface with the region of the belt adjacent each side of the seam conforming to the arcuate supporting surface of the support member with between about 10° and about 180° of wrap.

3. A process according to claim 1 including completing the traversing, heating, and quenching within about 3 and about 15 seconds.

4. A process according to claim 1 wherein the carbon dioxide laser thermal energy radiation has a power density of from about 0.01 watt per square millimeter to about 0.71 watt per square millimeter.

5. A process according to claim 4 wherein the carbon dioxide laser thermal energy radiation has a frequency range from about 50 hertz to about 200 hertz.

6. A process according to claim 1 wherein the carbon dioxide laser is a sealed carbon dioxide laser.

7. A process according to claim 1 including defocusing with a lens the thermal energy radiation from the dioxide laser.

8. A process according to claim 7 wherein the lens is a zinc selenide lens.

9. A process according to claim 1 including traversing the seam from one edge of the belt to the other with thermal energy radiation by moving the seam while maintaining the laser stationary.

10. A process according to claim 9 including traversing the seam from one edge of the belt to the other at a speed between about 2.54 centimeters and about 12.7 centimeters per second.

11. A process according to claim 1 wherein the thermal energy radiation from the laser has a circular cross section.

12. A process according to claim 1 wherein the electrostatographic imaging belt is an electrophotographic imaging belt comprising a charge generating layer and a charge transport layer and the layer comprising the thermoplastic polymer matrix is the charge transport layer.

13. A process according to claim 12 wherein the thermoplastic polymer matrix in the charge transport layer is polycarbonate resin containing dissolved or molecularly dispersed small charge transport molecules.

14. A process according to claim 1 wherein the electrostatographic imaging belt is an electrographic imaging belt comprising a supporting substrate layer and a dielectric imaging layer, the dielectric imaging layer comprising the thermoplastic polymer matrix.

15. A process according to claim 1 wherein the electrostatographic imaging belt is an intermediate transfer belt comprising a supporting substrate layer and an imaging layer, the imaging layer comprising the thermoplastic polymer matrix.

* * * * *